United States Patent [19]

Doescher et al.

[11] Patent Number: 4,957,324
[45] Date of Patent: Sep. 18, 1990

[54] COMBINATION GUIDE RAIL DOOR HANDLE

[75] Inventors: Robert D. Doescher, Bolingbrook, Ill.; James C. Skeel, Wausau, Wis.

[73] Assignee: J.I. Case Company, Racine, Wis.

[21] Appl. No.: 379,296

[22] Filed: Jul. 13, 1989

[51] Int. Cl.$^5$ .............................................. B60J 1/02
[52] U.S. Cl. ..................................... 296/190; 296/152
[58] Field of Search .......................... 296/152, 190, 1.1

[56] References Cited

U.S. PATENT DOCUMENTS

| | | | |
|---|---|---|---|
| 3,982,601 | 9/1976 | Williams | 296/190 |
| 4,162,097 | 7/1979 | Scribner | 296/190 |
| 4,416,486 | 11/1983 | McNaught | 296/190 |
| 4,605,259 | 8/1986 | Hurlburt | 296/190 |

Primary Examiner—Robert R. Song
Attorney, Agent, or Firm—Dykema Gossett

[57] ABSTRACT

An apparatus is disclosed that aids an operator in entering or leaving the cab of a large construction or farm vehicle. This apparatus consists of a series of steps leading from the ground up into the cab of the vehicle and two guide rails that guide the operator up into the cab. A first guide rail is fixed to the cab outer housing, and a second guide rail is fixed to the inner face of the cab door that provides access to the cab. The cab door guide rail is angled and positioned so as to aid in guiding the operator into or out of the cab and is also positioned so as not to interfere with the use of any accessories that may be mounted within the door. In addition, the cab door guide rail is useful as a door handle and allows the operator to quickly enter or exit the cab.

4 Claims, 2 Drawing Sheets

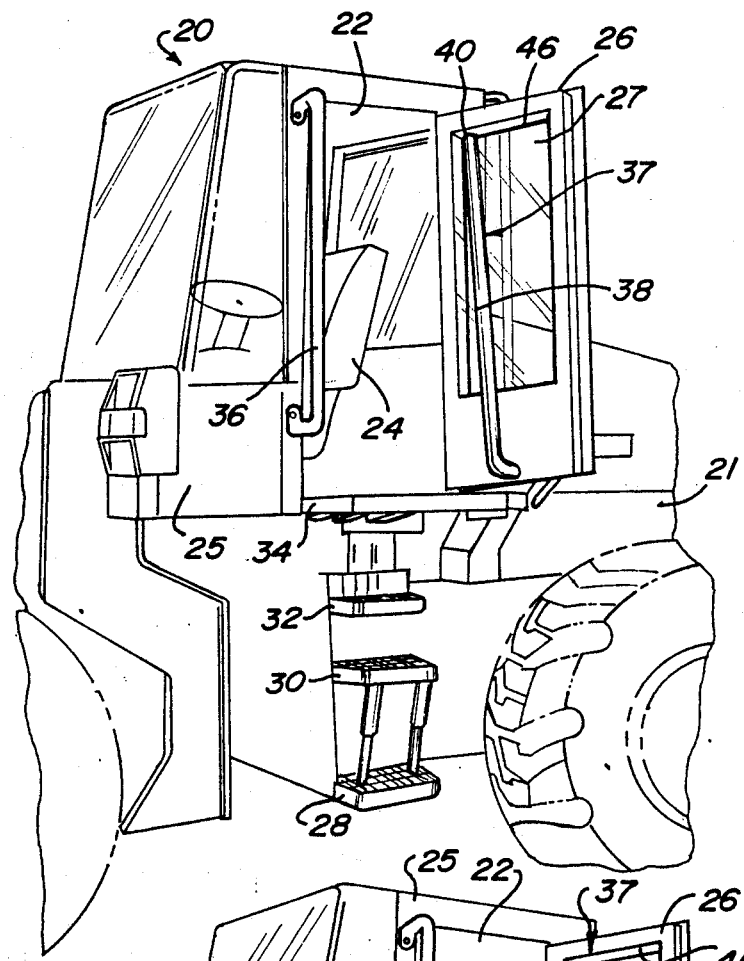
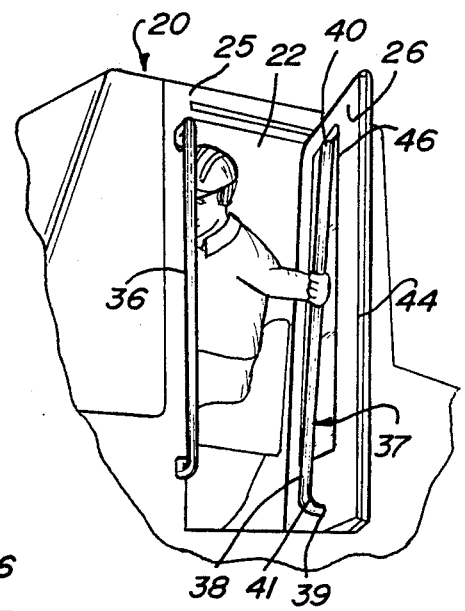
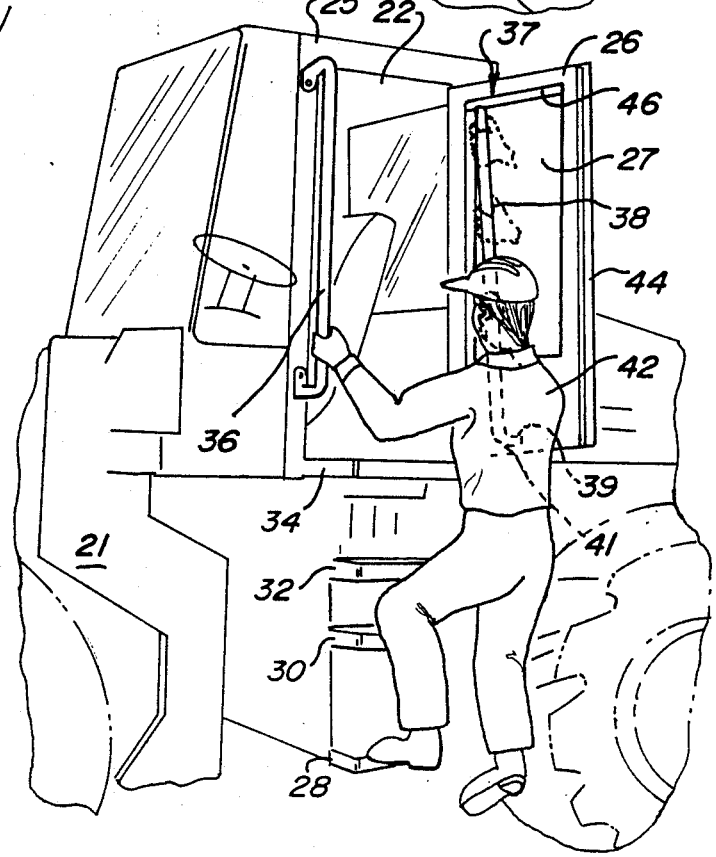
Fig-1
Fig-3
Fig-2

COMBINATION GUIDE RAIL DOOR HANDLE

BACKGROUND OF THE INVENTION

This invention in general relates to a system that will provide easier access to and from the cab of a large construction or farm vehicle.

Large vehicles are typically equipped with a cab mounted on top of the operative lower section of the vehicle, high above the ground level. The cabs of these vehicles are usually equipped with a door that ensures climate control within the cab. Some means are necessary to enable an operator to reach the cab level from the ground, and typically steps are mounted to the lower section of the vehicle to enable the operator to reach the cab. Also, a service platform may be used which extends outwardly from the door opening and acts as a final step into the cab.

It is desirable to have a means for guiding the operator into the cab and helping to support the operator as he moves vertically between the cab and the ground level. The prior art vehicles have had a fixed guide rail which is mounted to the cab housing parallel to and offset from one side of the cab door opening. This arrangement does not provide adequate guidance for the operator. Another prior arrangement may be described as a bent tube on the cab door. However, operators who use these types of vehicles typically enter and leave the cab quickly. It can be inconvenient or awkward to do this using a fixed or bent guide rail. If a handle were placed within the cab, it would also be inconvenient or awkward, if not impossible, for the operator to reach the handle and guide himself into the vehicle cab. Thus, there is a need for an improved guide rail system for the cab assembly of large vehicles.

It is, therefore, an object of the present invention to provide a guide rail assembly that will provide an operator easy access to the operator's station and permit the operator to return quickly and easily between the cab and the ground level.

It is further an object of the present invention to provide a guide rail assembly that is compact and strategically located so that it does not interfere with any other operations that an operator performs within the vehicle cab.

These and other objects are addressed by the present invention.

SUMMARY OF THE INVENTION

In accordance with the present invention, a guide rail assembly for large vehicles is disclosed that will provide an operator with two guide rails that are easily grasped when entering or leaving the vehicle cab. The guide rail assembly includes a first fixed guide rail attached to a vehicle cab parallel to and spaced from the cab door. In addition, a second guide rail is mounted to the inner face of the cab door and provides an easily grasped guide rail when the door is swung outwardly open. Steps are provided on the lower portion of the construction vehicle to aid an operator in moving between the ground level and the cab, and these two guide rails act to assist the operator in this movement. The cab door is mounted such that it can open approximately 120 degrees, at which time it hits a stop member. The second guide rail is mounted to the inner face of the cab door on an angle, and therefore, the force of the operator grasping the guide rail will tend to move the cab door further outwardly against its stop member. Thus, the second guide rail will tend to move the door further outwardly and will not cause it to turn back inwardly towards the operator while he is mounting the vehicle.

The mounting of the second guide rail also assists the operator and tends to guide him into the cab. The guide rail is also positioned in such a way that it will not restrict the operator or interfere with any movements that may be necessary within the cab. This second guide rail consists of a one-piece bar with a first axial end attached near the bottom of the cab door and a first portion extending perpendicular into the vehicle cab from this first axial end. The second axial end is attached to a portion of a window frame near the top of the cab door. The first axial end is mounted to the cab door further away from the hinge axis of the cab door than is the second axial end; this arrangement tends to guide the operator into the cab as he moves upwardly along the guide rail. In addition, this guide rail acts as a handle for the door, and since it extends almost the full length of the door, it is easily accessible to the operator.

BRIEF DESCRIPTION OF THE DRAWINGS

FIG. 1 is a perspective view showing a large construction vehicle with the cab and the guide rail system of the present invention.

FIG. 2 is a perspective view showing an operator moving between the vehicle cab and the ground.

FIG. 3 is an enlarged view showing the door of the cab of the present invention with an operator utilizing the guide rail of the present invention as a door handle.

DETAILED DESCRIPTION OF THE INVENTION

Figure 4:
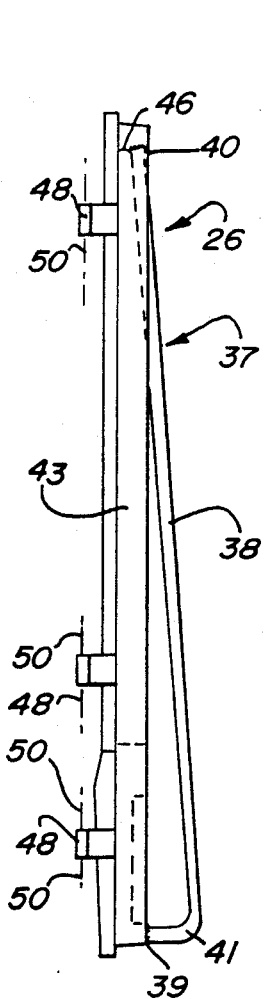
FIG. 4 is a cross-section facing the vehicle door from the door hinge axis.

As shown in FIG. 1, a large loader vehicle 20 is formed of lower portion 21 and cab 22 mounted above lower portion 21. Cab 22, with side wall 25, contains operator seat 24 and cab door 26 located in close proximity to seat 24 so that the door may be opened by an operator while seated in seat 24. Window 27 can be seen to be mounted within door 26.

Cab 22 is located above lower portion 21 at a first vertical location above the ground level. To aid an operator in reaching cab 22, steps 28, 30 and 32 are mounted extending outwardly from the side of the vehicle. Service platform 34 acts as the final step; it is located vertically at the height of the cab floor and extends outwardly from the side of the vehicle as do steps 28, 30, 32. To aid the operator in reaching the cab and going from the cab back down to the ground, there is mounted fixed guide rail 36 and cab door guide rail 37.

Fixed guide rail 36 is mounted to cab side wall 25 generally parallel and adjacent to cab door 26. Cab door guide rail 37 has handle portion 38 that acts in conjunction with fixed guide rail 36 when cab door 26 has been swung open. Cab door guide rail 37 consists of first axial end 39 fixed to the lower portion of cab door 26 and second axial end 40 fixed near the upper end of the cab door 26. Portion 41 of cab door guide rail 37 extends perpendicular from cab door 26 and merges into handle portion 38. Operator 42 can be seen in FIG. 2 utilizing guide rails 36, 37 and steps 28, 30, 32 to enter vehicle cab 22.

Cab door 26 is pivotally attached to side wall 25 at a first lateral end 43 and has second lateral end 44 which is disposed near fixed guide rail 36 when cab door 26 is closed. As can be seen most clearly in FIG. 5, first axial end 39 of cab door guide rail 37 is fixed to cab door 26 at a position further away from first lateral side 43 of the cab door than is second axial end 40 of the cab door guide rail. This results in guide rail 37 being angled toward the first lateral side 43 as one moves upwardly along its length. Guide rail 37 is also angled inwardly from the bottom of cab door 26 to its top, as illustrated in FIG. 4. Due to this arrangement, the weight of an operator on guide rail 37 will tend to be applied forwardly away from the operator and forcing the door further open against a stop member. The angled relationship will cause the operator to lean inwardly against the rail 37 and this will insure that his weight is applied to force the door open. These results would not be expected without the angles since an operator would normally pull downwardly on the rail tending to bring the door towards himself and into a closed position. Thus, the angled mounting of rail 37 insures that such a force is not reactive on rail 37. This angled guide rail will also assist an operator towards the cab as he moves up the steps.

Window frame 46 is formed by the inner periphery of an opening within cab door 26 that receives window 27. As can be seen clearly from FIGS. 1 and 2, the window does not extend to the innermost face of cab door 26, and thus there is a portion of frame 46 between the window 27 and the inner face of cab door 26. It is at this portion of frame 46 that the second axial end of cab door guide rail 37 is mounted. As can be seen most clearly from FIG. 4, this results in cab door guide rail 37 being further away from door 26 at its lowermost end due to portion 41 that extends outwardly from the cab door and extends back inwardly towards the cab door along handle portion 38. In a preferred embodiment, handle portion 38 is bent inwardly towards the door at an angle of 4 degrees with respect to portion 41.

FIG. 3 illustrates operator 42 utilizing the cab door guide rail 37 for a second purpose as disclosed by the present invention. As shown in FIG. 3, the operator is using handle portion 38 of the cab door 26 as a door handle to swing it outwardly. Having elongate cab door guide rail 37 act as the door handle allows operator 42 to easily open door 26 from a variety of positions.

As shown in FIG. 4, cab door 26 is mounted to cab housing 25 at its first lateral face 43 on hinges 48. Hinge axis 50 can be seen to extend through hinges 48.

Figure 5:
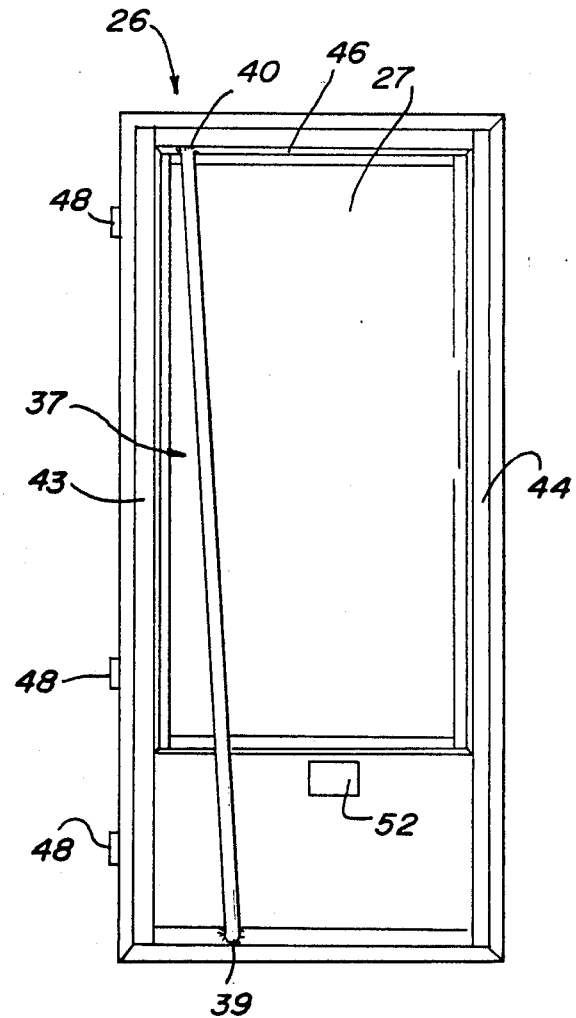
FIG. 5 is a plane view showing the inner face of the cab door with the guide rail of the present invention.

As seen in FIG. 5, the inner face of cab door 26 may also include accessories, such as ashtray 52. Another benefit from cab door guide rail 37 being angled towards the first lateral face of cab door 26 is that there will be easier access to any accessories within the door, such as ashtray 52.

Figure 6:
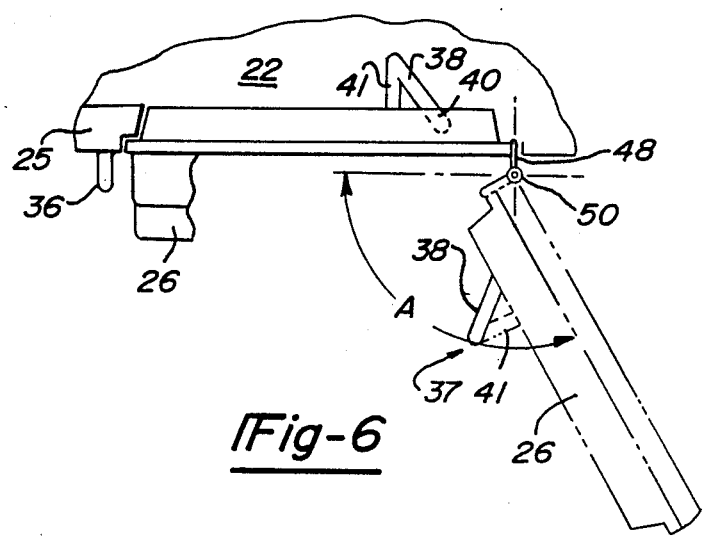
FIG. 6 is a top view showing the movement of the cab door between its closed and open positions.

FIG. 6 illustrates the movement of door 26 as it is swung to its open position. As can be seen, the door may be positioned in its closed position against cab housing 25 near fixed guide rail 36, or it may be opened about an angle A to its opened position providing access to or from cab 22. Angle A has a predetermined maximum value and a hinge stop will act to restrict further turning of door 26 once angle A reaches this predetermined maximum value. In a preferred embodiment of the invention, the predetermined maximum angle for the angle A would be 120 degrees. As can be appreciated from FIG. 6, if door 26 is in its open position and an operator is using guide rails 36, 37 to enter vehicle cab 22, any force applied on cab door guide rail 37 would be applied counterclockwise about hinge axis 50. For this reason, the door would tend to be opened further until it reaches its predetermined maximum as opposed to being accidentally pulled back inwardly to its closed position.

The operation of the present invention will now be described with reference to the drawings, particularly FIGS. 2 and 3. When operator 42 wishes to enter the cab, he must first open door 26. Once the door is opened, the operator can grasp guide rails 36, 37 and begin ascending steps 28, 30, 32. Since cab door guide rail 37 is angled rearwardly and inwardly towards hinge axis 50 of the door, operator 42 is eased toward the cab as he ascends the steps 28, 30, 32. Since service platform 34 extends outwardly from the side wall of the vehicle, it is important that guide rail 37 be mounted on cab door 26. If, for instance, the guide rail were mounted somewhere inside the cab, it would be awkward to reach it, since service platform 34 extends so far outwardly from vehicle 20. Once operator 42 has reached service platform 34, he may enter cab 22 and close door 26 by pulling on guide rail 37 and using it as a handle. As shown in FIG. 3, the operator is closing door 26 by pulling handle 37 inwardly towards vehicle cab 22. While operator 42 is enclosed in cab 22, he will have complete access to any accessories that may be mounted in cab door 26, such as ashtray 52, since the cab door guide rail is angled rearwardly along its length.

A working embodiment of the present invention has been disclosed; however, further modifications of the invention may be made without departing from the scope and content of the invention, which can be better understood when considered in light of the appended claims.

What is claimed is:

1. A vehicle comprising:

a housing;

an operator's cab area provided within said housing, said housing having a first face facing inwardly towards said cab area and a second face facing the outside environment;

an opening through said housing leading into said cab area from the outside environment;

a door pivotally mounted to said housing at one lateral side of the door opening for rotation about an axis at said opening and having a first face facing into said cab area and a second face facing the outside environment, said door having a closed position blocking entry or exit of an operator between said cab area and the outside environment and being capable of pivotal movement to an open position of allow entry or exit between said cab area and the outside environment;

a first guide rail generally vertically extending and fixedly mounted to said second face of said housing at the opposite lateral side of the door opening; and a second guide rail mounted to said first face of said door, said second guide rail being angled relative to said axis and angled relative to said first door face, said first and second guide rails aiding an operator in entry or exit between the cab and the outside environment.

2. A vehicle as recited in claim 1, and wherein said door has a top and a bottom, a first lateral side and a second lateral side, said pivotal mounting of said door to said housing being at said first lateral side; and said second guide rail having a first axial end and a second axial end, said first axial end of said second guide rail being mounted near the bottom of said door and said second axial end of said second guide rail being mounted near the top of said door, the first axial end of said second guide rail being spaced further from said first lateral side of said door than said second axial end of said second guide rail.

3. A vehicle as recited in claim 2, and further wherein said second guide rail comprises a first portion extending from said first axial end perpendicular to said cab door and a second portion extending from said first portion to said second axial end, and said second guide rail angled toward said first lateral side from the bottom of the door to the top of the door and said second guide rail angled inwardly toward said door from the bottom of the door to the top of said door.

4. A vehicle comprising:
- a lower portion having a side that extends longitudinally and vertically from the ground upwardly;
- a cab housing mounted above said lower portion at a first vertical position;
- at least one step attached to said lower portion side at a second vertical position, said second vertical position being lower than said first vertical position, said step aiding an operator in traveling between ground level, the first vertical and the second vertical positions;
- a service platform mounted generally at said first vertical position, said service platform and said step extending outwardly from said lower portion side;
- a door pivotally mounted to said cab housing and providing access thereto, said door having a closed position and an open position where it is pivoted outwardly from said side, said door having first and second lateral sides and being mounted to said cab housing at said first lateral side, said door having an inner and an outer face and a top and bottom end, said door having an opening generally near the top thereof;
- a window mounted in said door opening, the inner periphery of said opening being defined as a window frame, and a portion of said window frame extending between said window and said inner face of said door;
- a first guide rail mounted to said cab housing parallel to, and slightly spaced from, said second lateral side of said door; and
- a second guide rail mounted to said door, said second guide rail having first and second axial ends attached to said door, said first axial end being spaced further from said first lateral side of said door than said second axial end, said first axial end being mounted near the bottom of said inner face of said door, and said second axial end being mounted to said portion of said window frame that exists between said window and said inner face, said second guide rail having a first portion extending from said first axial end of said second guide rail away from and generally perpendicular to said inner face of said door and a second portion extending from said first portion back towards said inner face of said door to said second axial end of said second guide rail.

* * * * *

UNITED STATES PATENT AND TRADEMARK OFFICE
CERTIFICATE OF CORRECTION

PATENT NO. : 4,957,324

DATED : 9/18/90

INVENTOR(S) : Robert D. Doescher and James C. Skeel

It is certified that error appears in the above-identified patent and that said Letters Patent is hereby corrected as shown below:

> In column 4, line 56, delete "of" and insert therefor --to--.

Signed and Sealed this

Third Day of December, 1991

Attest:

HARRY F. MANBECK, JR.

*Attesting Officer*        *Commissioner of Patents and Trademarks*